United States Patent [19]
Warner et al.

[11] 3,904,473
[45] Sept. 9, 1975

[54] APPARATUS FOR PRODUCING A BILAYERED GREEN CERAMIC TAPE

[75] Inventors: Leadom A. Warner, Sayre; Joseph J. Cleveland, Wysox, both of Pa.

[73] Assignee: GTE Sylvania Incorporated, Stamford, Conn.

[22] Filed: Aug. 29, 1973

[21] Appl. No.: 392,761

[52] U.S. Cl. ............................... 156/470; 425/370
[51] Int. Cl.[2] ........................................... B31F 1/00
[58] Field of Search.... 156/205, 208, 210, 470–473; 425/362, 369, 370, 373; 186/307, 308

[56] References Cited
UNITED STATES PATENTS

| | | | |
|---|---|---|---|
| 1,858,375 | 5/1932 | Schroeder et al. | 156/473 |
| 2,173,852 | 9/1939 | Miller | 156/471 |
| 2,494,642 | 1/1950 | Case et al. | 425/370 |
| 2,609,314 | 9/1952 | Engel et al. | 425/370 |
| 2,656,565 | 10/1953 | Apel et al. | 425/373 |
| 3,142,599 | 7/1964 | Chavannes | 156/210 |
| 3,165,783 | 1/1965 | Martelli | 425/370 X |
| 3,445,315 | 5/1969 | Strauss | 156/308 X |

*Primary Examiner*—Douglas J. Drummond
*Assistant Examiner*—David A. Simmons
*Attorney, Agent, or Firm*—Norman J. O'Malley; Donald R. Castle; Lawrence R. Fraley

[57] ABSTRACT

There is disclosed an apparatus for producing a bilayered green ceramic tape having a corrugated first layer and a substantially flat second layer bonded thereto. The apparatus comprises a first supply means for supplying a substantially flat pliable first layer, a forming means for forming said first layer with a corrugated cross section, a drive means associated with the forming means for providing relative movement thereto, a second supply means for supplying a substantially flat pliable second layer of material, and a bonding means for bonding the first and second layers. A method for producing the above described ceramic tape is also disclosed.

8 Claims, 4 Drawing Figures

APPARATUS FOR PRODUCING A BILAYERED GREEN CERAMIC TAPE

CROSS-REFERENCE TO RELATED APPLICATIONS

Several compositions of green ceramic tapes are disclosed in a related U.S. application Ser. No. 313,102, "Process for Producing Controlled Flexability in Ceramic Tapes", and assigned to the same assignee as that of the present invention.

BACKGROUND OF THE INVENTION

This invention relates to the manufacture of ceramic articles and more particularly to the manufacture of bi-layered green ceramic tapes having a corrugated first layer and a substantially flat second layer bonded thereto. As is well known in the art, ceramics are considered premium materials of construction for several uses in that they are highly resistant to heat and most forms of erosion and corrosion. Several examples of uses of ceramics include heat exchanges for waste heat removed from exhaust gases, supports for catalysts for the automotive catalytic muffler, and similar uses where the atmosphere is both hot and corrosive. Many of the above ceramics are produced utilizing a multi-step process during which the basic ceramic compositions are prepared in a slurry state, the slurry ingredients are treated, i.e. ball milled, after which the slurry is cast into a tape using what is known in the art as a doctor blade. The blade is adjusted to give a desired thickness of tape. For many uses, the resulting thickness of this final ceramic green tape is approximately 5 to 7 mils.

After casting the tape, the solvent which comprised one of the components of the slurry is then evaporated resulting in a now workable green product.

A previous problem inherent in many of the green ceramic tapes of the prior art has been the inability of the corrugated first layer to maintain its established shape after subsequent bonding to the flat adjoining layer. Usually such deformation occurred when the article was rolled into a cylindrical shape or stacked in established columns.

A well known method for maintaining the corrugated layer in its desired shape has been to utilize a thin sheet of aluminum foil as a support member. This method, however, is limited to those ceramics in which the raw material has a metal foil because the foil is the major contributor to the strength of the green film.

To assist in solving the above-described problem, there are disclosed in U.S. application Ser. No. 313,102 formulations for self supporting ceramic tapes which, when subsequently subjected to a proper forming process, will overcome the above-cited disadvantages of prior art ceramic articles. These formulations consist essentially of sinterable solid particles of ceramic raw materials substantially uniformly distributed throughout a supporting media. The weight of the supporting media to these materials is in the ratio of from about 1:3 to about 1:6. The media consists essentially of a thermoplastic resin, a plasticizer, an organic solvent and a deflocculant, each established within the described media according to specified percentages.

To form these and similar green tape compositions into the configurations desired has thus resulted in the development of a new apparatus and process.

It is believed therefore that an apparatus and process which can produce a bilayered green ceramic tape having a corrugated first layer and a substantially flat second layer bonded thereto without the necessity for requiring additional items such as aluminum foil supports while still assuring that the resulting tape will maintain its desired configuration after bonding would be an advancement in the art.

OBJECTS AND SUMMARY OF THE INVENTION

Consequently, it is a primary object of this invention to provide an apparatus and method for producing a bilayered green ceramic tape.

It is a further object of this invention to provide an apparatus and method which produces such tapes without requiring additional supportive members therewith in order to assure proper alignment of each layer of the bonded finished article.

It is an even further object of this invention to provide an apparatus as described which is relatively easy to operate as well as inexpensive to utilize.

In accordance with one aspect of this invention, there is provided an apparatus for producing a bilayered green ceramic tape having a corrugated first layer and a substantially flat second layer bonded thereto. The apparatus comprises a first supply means for supplying a substantially flat pliable first layer to the apparatus, a forming means for providing the first layer with a corrugated cross section, a drive means for providing movement to the forming means, a second supply means for supplying a substantially flat pliable second layer to the apparatus, and a bonding means for bonding the corrugated first layer and the flat second layer together.

In accordance with another aspect of this invention, there is provided a method for producing a formed green ceramic shape and comprising the steps of a) forming a substantially flat pliable layer of green ceramic to a shape having a corrugated cross section, b) supplying a flat pliable second layer to the apparatus, and c) bonding a second layer of a green ceramic to one side of the corrugated first layer.

DETAILED DESCRIPTION OF THE PREFERRED EMBODIMENTS

For a better understanding of the invention, together with other and further objects, advantages and capabilities thereof, reference is made to the following specification and appended claims in connection with the above-described drawings.

Figure 1:
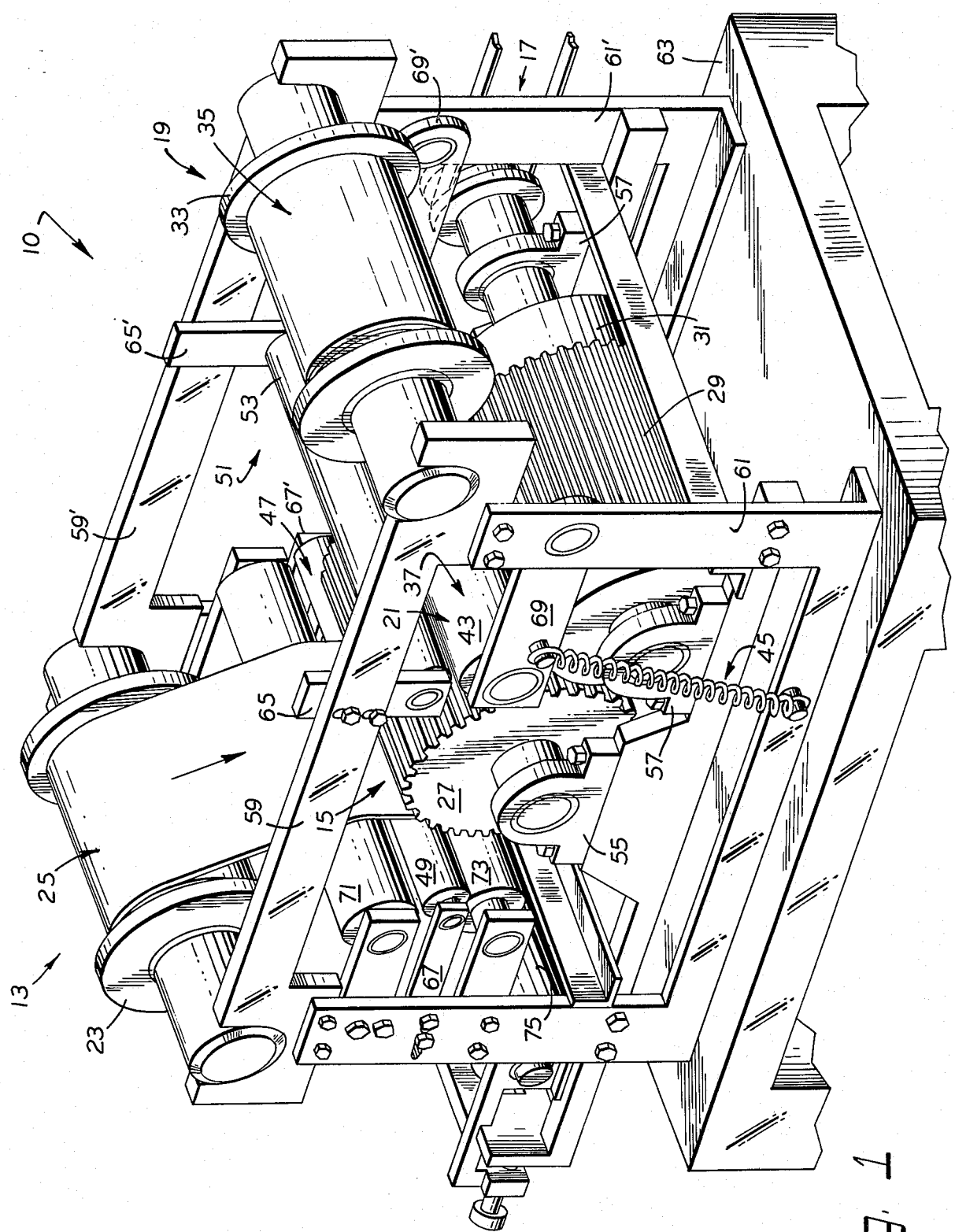
FIG. 1 is an isometric view of the present invention.
Figure 2:
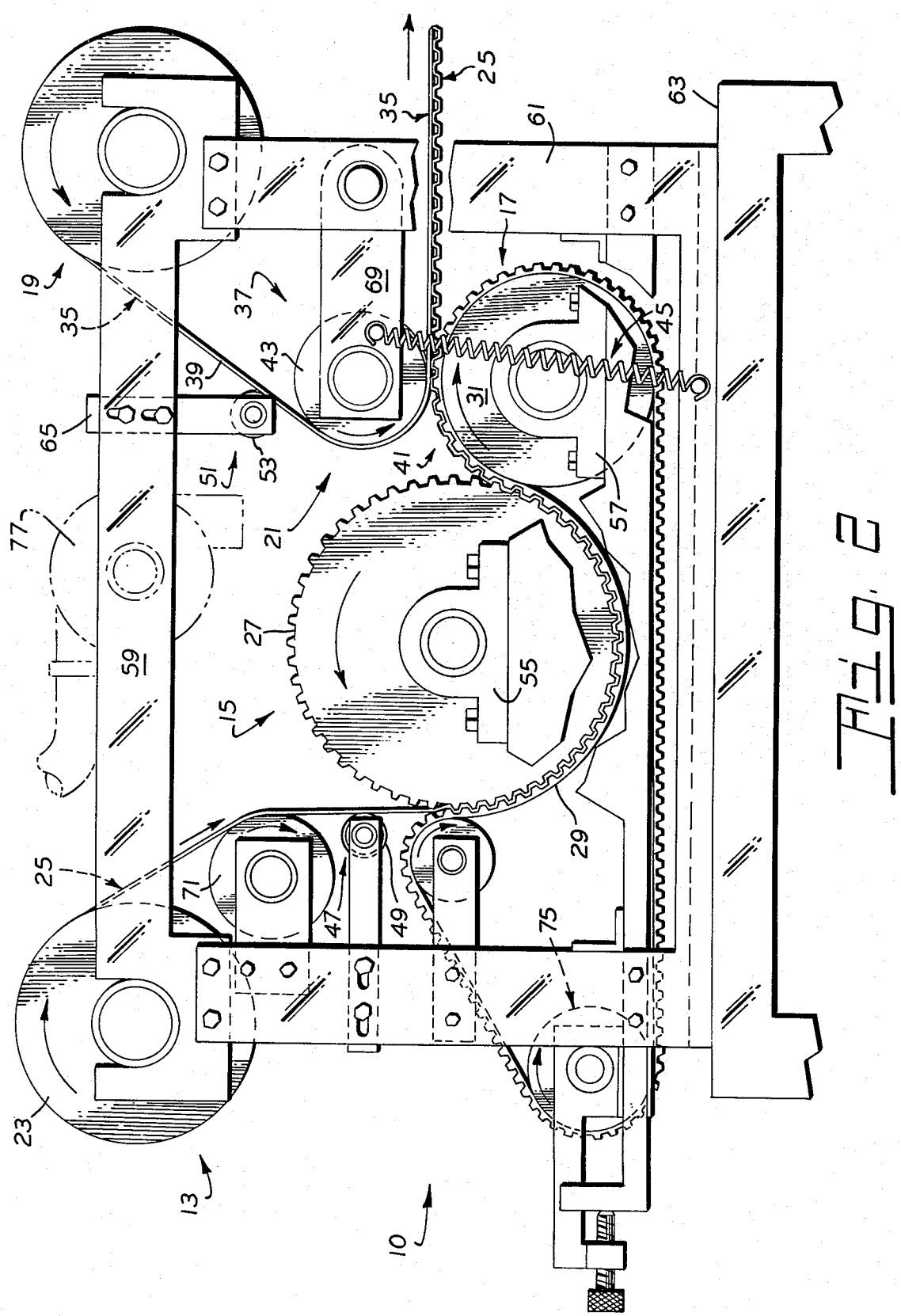
FIG. 2 is a side elevational view of the invention as shown in FIG. 1.

With particular reference to FIGS. 1 and 2, there is shown the apparatus 10 in accordance with one embodiment of the present invention. Apparatus 10 comprises a first supply means 13, a forming means 15, a drive means 17, a second supply means 19, and a bonding means 21.

First supply means 13 is illustrated as comprising a spool member 23 having a roll of substantially flat pliable green ceramic tape thereon. As can be appreciated, spool 23 represents but one of many possible supply means which can successfully be utilized with the present invention. Apparatus 10 can be positioned at the end of the green tape casting equipment and directly receive tape 25 therefrom. In this event spool 23 would not be required.

Green tape 25, in substantially flat pliable form, is supplied in the manner indicated to forming means 15. As readily seen in the drawings, forming means 15 comprises a ribbed rotatable cylinder 27 which operates in conjunction with a ribbed belt member 29. Belt member 29 is adapted for exerting pressure against cylinder 27 for a predetermined period of time and is preferably of the more durable rubber compositions such as neoprene. Belt 29, preferably an endless type, may even be metallic in nature. Ribbed cylinder 27 is preferably stainless steel or aluminum.

Drive means 17, associated with forming means 15 and adapted for providing relative movement thereto, is illustrated as comprising a drive cylinder 31 which is adapted for engaging belt 29 in the manner indicated and thereby moving belt 29 at a predetermined rate. Drive cylinder 31 as shown in FIG. 1 is driven by a drive apparatus (not shown) located externally of apparatus 10. As can be appreciated, several varieties of drive apparatus, i.e. a single motor-pulley assembly can be utilized with the apparatus.

Second supply means 19, similar to that of first supply means 13, comprises a revolving spool 33 having a roll of substantially flat pliable green ceramic tape 35 thereon. As with spool 23, spool 33 is illustrative of but several possible means for supplying tape 35 to the apparatus and is not meant to be restrictive with regard to the present invention. For all intended purposes, tape 25 which comprises the first layer of the ultimate bilayered article to be produced and tape 35 which comprises the second layer for this article are substantially the same material. It is to be understood, however, that layers of varying composition may also be bonded utilizing the apparatus of the present invention.

Bonding means 21 adapted for positioning second layer 35 and thereafter bonding layer 35 to first layer 25, is illustrated as comprising a pressure exerting means 37 positioned relative to drive cylinder 31. Pressure exerting means 37 is adapted for positioning a first surface 39 of substantially flat second layer 35 on a first side 41 of first layer 25 after first layer 25 has passed through forming means 15 and thereby provided with the corrugated cross section as illustrated. Pressure exerting means 37 exerts a predetermined amount of pressure against second layer 35 as first layer 25 and second layer 35 pass between exerting means 37 and drive cylinder 31 in the manner indicated. More specifically, exerting means 37 comprises a rotatable cylinder 43 aligned with and positioned substantially above drive cylinder 31, the rotatable cylinder 43 having a spring means 45 associated therewith. Spring means 45 is adapted for exerting downward pressure on cylinder 43 against second layer 35 as the layer passes through the described bonding means 21.

To assure that first layer 25 will adhere to belt 29 upon leaving forming means 15 and thereafter entering bonding means 21, there is provided a means 47 for applying an organic solvent to the surface of layer 25 which ultimately engages ribbed belt member 29 within forming apparatus 15. Practically any of the well known organic solvents may be utilized with apparatus 10 and include the alcohols methanol, ethanol, or isopropanol as well as many keytone derivatives. In the present embodiment, the solvents toluene and xylene are utilized, with preference given to xylene. The purpose of the above-described solvents is to form a tacky film by slightly dissolving the surface of the tape to which it is applied. Therefore, any solvent which achieves this purpose may be successfully utilized. By forming the tacky film described, this surface will more readily adhere to belt 29 and can therefore be more easily fed into bonding means 21. The solvent is applied to first layer 25 by utilizing a dispensing roller 49. Solvent is placed on the roller 49 by utilizing a bottle having solvent therein and applying it directly to the surface of the roller. Means 47 is only indicative of but one method possible for applying the solvent. Others may include a squegee type applicator or even a fine mist spray device is possible. It has been found that by applying from about 10 to about 30 mililiters of solvent per 100 square foot of area of the surface of layer 25, maintaining layer 25 within forming means 15 for a period of from about 10 to about 80 seconds, and applying from about 0.25 to about 10 pounds of pressure per square inch against the surface while the layer is within means 15, first layer 25 will adequately adhere to belt 29 upon leaving the forming means. It is to be remembered, however, that this is not meant or desired to be a permanent type adherence. Application of the above-described quantities within the ranges specified assures that first layer 25 will be retained on belt 29 at least until entering bonding means 21. Thereafter, the corrugated first layer 25 can simply be removed from the belt by a relatively small pulling force as would be provided by a take-up means such as a spool or similar article (not shown) upon which the assembled tape article may be accumulated. It is to be understood that the predescribed variables are but one example of a workable solution to assuring first layer 25 adherence to the belt. However, it is also to be understood that modifications to these variables are permissible and will readily work with apparatus 10. The above-described ranges are therefore only cited as being the preferable ranges for the mentioned variables.

A second means 51 is also provided for applying an organic solvent to first surface 39 of the substantially flat pliable second layer 35. Similar to means 47, second means 51 comprises a dispensing roller 53 positioned as illustrated. The organic solvent utilized with dispensing roller 53 can be the same as that for roller 49, that being any of the well known organic solvents. As in means 47, however, either toluene or xylene are preferred. When the solvent is applied to second layer 35 at approximately 10 to about 30 mililiters of solvent per one hundred square foot of area of first surface 39 and the surface thereafter subjected to a pressure by pressure exerting means 37 within the range of from about 20 to about 60 pounds per square inch, it has been found that a successful bond can be achieved between first and second layers 25 and 35, respectively. These ranges, as before, are not meant in any way to be restrictive to the present invention and may be altered accordingly as the conditions permit.

Ribbed cylinder 27 is maintained within apparatus 10 by positioning the shaft of the cylinder within the pair of established bearings 55 (one being shown in the drawings). In similar manner, the shafts of drive cylinder 33 are positioned within the pair of opposing bearings 57, both clearly shown in FIG. 1. The shafts for supply spools 23 and 33 are positioned within a pair of substantially parallel horizontally aligned support beams 59 and 59' respectively. Beams 59 and 59' are supported by upright frame members 61 and 61' respectively. Each of the upright frames is positioned on a surface 63 of a table or similar article to thereby provide support for apparatus 10. The dispensing roller 53 is secured within apparatus 10 by the manner indicated in which a pair of opposing aligned braces 65 and 65' are affixed in a movable manner to beams 59 and 59' respectively. Similarly, dispensing roller 49 is held in the manner indicated by a pair of brace supports 67 and 67', each of which are positioned in an adjustable manner to upright frames 61 and 61' accordingly. Rotatable roller 43 is positioned within a pair of movable supports 69 and 69' and thereby adapted for having pressure downwardly exerted in the manner indicated by spring 45.

Only one spring member 45 is illustrated in the drawings, but it is to be understood that two may be utilized, each on an opposing side of apparatus 10. It is also to be understood that spring 45 represents but one means possible for exerting pressure on roller 43. Another acceptable means could incorporate the suspending of weights or weighted articles from the movable support arms 69 and 69'.

To more readily assure the proper positioning of first layer 25 within forming means 15, an auxiliary roller 71 is provided and positioned in the manner indicated. Additionally, rollers 73 and 75 are provided for assisting in the engagement and alignment of belt 29.

As shown in FIG. 2, an auxiliary heater 77, illustrated in phantom, may be utilized with apparatus 10. The function of heater 77 is to heat both first and second layers 25 and 35 respectively, prior to passing these layers through bonding means 21. The purpose of the heat would be to substitute for the described organic solvent additives. In this manner, both adherence of first layer 25 to belt 29 for the time period required as well as a substantially strong bond between first surface 39 and side 41 would be achieved. It has been determined that the previously described adherence and bond can successfully be attained by heating the layers involved to a temperature within the range of from about 120°F to about 180°F. A desired adherence by layer 25 on belt 29 is achieved by thereafter maintaining first layer 25 within forming means 15 for a period of from about 10 to about 80 seconds and applying from about 0.25 to about 10 pounds of pressure per square inch against the surface of layer 25. A successful bond between layers 25 and 35 is achieved by heating the layers within the described temperature range and thereafter applying a predetermined pressure of from about 5 to about 20 pounds per square inch on second layer 35 against corrugated first layer 25 as the mated layers pass through bonding means 21 in the manner indicated.

Still another successful bond may be achieved between first and second layers 25 and 35 by firstly applying one of the described organic solvents to first surface 39 in the manner shown and in the amounts previously listed (from about 10 to about 30 mililiters of solvent per 100 square foot of surface 39 area), and thereafter heating the layers to a temperature within the range of from about 120°F to about 180°F. A bond can then be achieved by simply passing the two layers through bonding means 21. However, in this particular embodiment, the previously described bonding pressures are not required. Bonding means 21 need only function to position the 2 layers in an engaging relationship.

Figure 3:
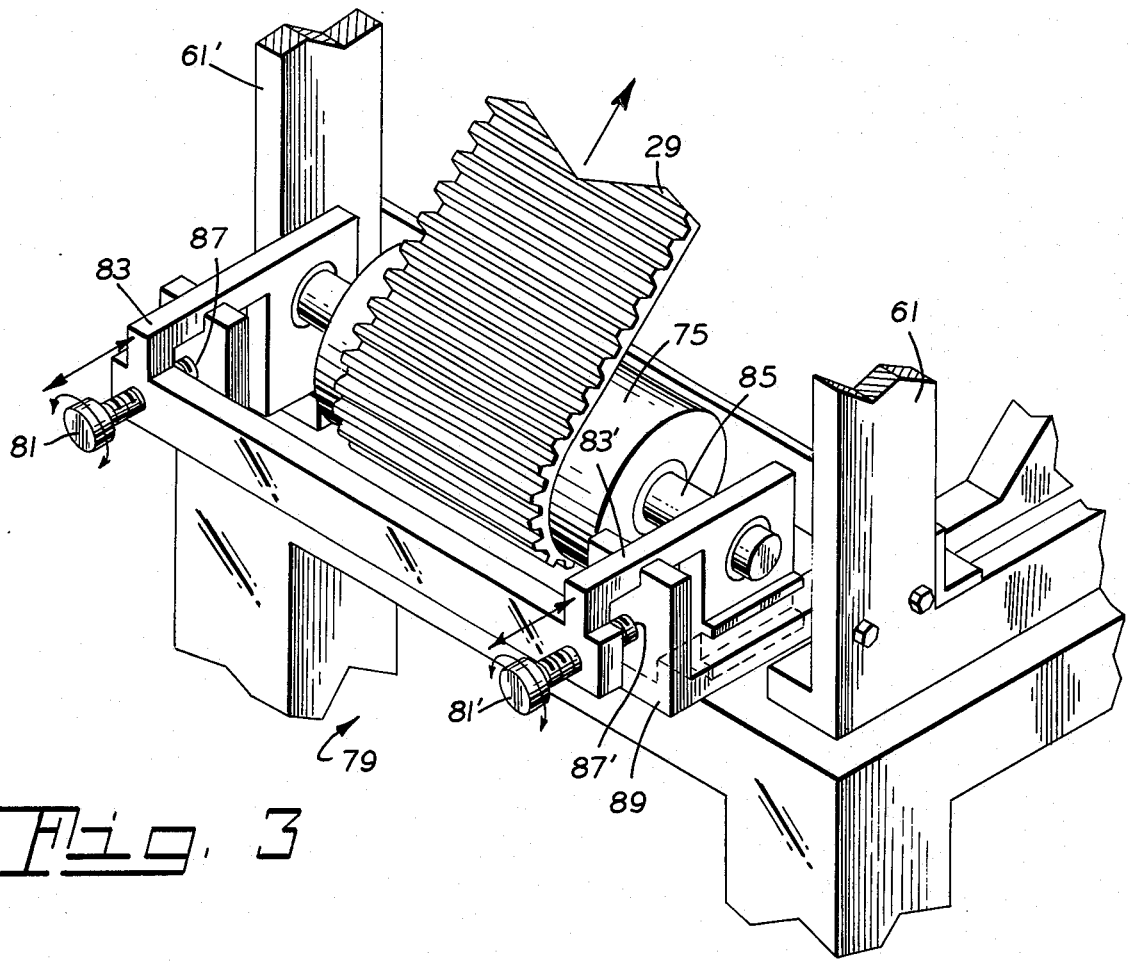
FIG. 3 is an isometric view of the adjustment means of the present invention.

In FIG. 3, there is illustrated an adjustment means 79 whereby the pressure exerted by belt 29 against roller 27 can readily be adjusted. Adjustment means 79 comprises a pair of adjusting screws 81 and 81' which are respectively threaded through parallel support arms 83 and 83' in which is positioned shaft 85 of roller 75. The ends 87 and 87' of adjusting screws 81 and 81' are adapted for being turned against a supportive brace 89 which is affixed on both sides to upright frames 61 and 61' respectively. Accordingly, as adjusting screws 81 and 81' are turned either in the clockwise or counterclockwise direction, roller 75 is thereby moved in a direction toward or away from drive cylinder 31, thus decreasing or increasing the tension of belt 29.

Figure 4:
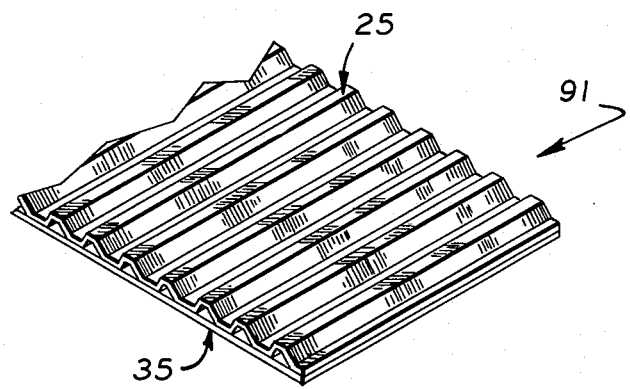
FIG. 4 illustrates one example of a bilayered tape article which can be produced utilizing the present invention.

In FIG. 4 there is illustrated one example of an assembled green ceramic tape article 91 which can be produced by apparatus 10. Tape 91 comprises a corrugated first layer 25 and a substantially flat second layer 35 bonded thereto. This green article is next subjected to a series of heating steps in order to become a finished ceramic. Prior to these heating steps, green tape 91 is arranged in an established position such as a cylindrical roll. The arranged article is then heated to the required temperatures. In one example, the rolled tape is heated at 500°F for a period of approximately 10 hours afterwhich it is cut to established dimensions. Thereafter, the article is heated in a fired kiln at approximately 1200°C to 1500°C depending on its ultimate use. The article is now a finished ceramic.

Thus, there has been shown and described an apparatus and a method for producing a bilayered green ceramic type article wherein the article comprises a corrugated first layer and a substantially flat second layer bonded thereto. The apparatus and method as described do not require the need for additional supportive materials such as aluminum backing, etc. in order to assure a composite article wherein the resulting configurations will not readily deform. There has also been shown an apparatus and a method which is relatively easy to operate as well as inexpensive to utilize.

While there have been shown and described what are presently considered the preferred embodiments of this invention, it is obvious to those skilled in the art that various changes and modifications may be made therein without departing from the scope of the invention as defined by the appended claims.

What is claimed is:

1. An apparatus for producing a bilayered green ceramic tape having a corrugated first layer and a substantially flat second layer bonded thereto, said apparatus comprising:

first supply means for supplying a substantially flat pliable first layer of green ceramic material to said apparatus;

forming means for forming said first layer whereby said first layer is provided with a corrugated cross section, said forming means comprising a ribbed rotatable cylinder and a ribbed belt member adapted for exerting pressure against said cylinder, said cylinder and belt member engaging said first layer and passing said first layer therbetween for a predetermined period of time whereby said first layer will engage a substantial portion of the outer ribbed portion of said rotatable cylinder;

solvent dispensing means adapted for applying an organic solvent to the surface of said substantially flat first layer which engages said ribbed belt member prior to said engagement;

drive means associated with said belt member of said forming means for providing relative movement thereto;

second supply means for supplying a substantially flat pliable second layer of green ceramic material to said apparatus; and bonding means adapted for positioning and bonding a first surface of said flat second layer to a first side of said corrugated first layer.

2. The apparatus according to claim 1 wherein said bonding means comprises a pressure exerting means positioned relative to said drive means, said pressure exerting means adapted for positioning a first surface of said substantially flat second layer on a first side of said corrugated first layer and for exerting a predetermined amount of pressure against said positioned second layer as said first and second layers pass between said pressure exerting means and said drive means.

3. The apparatus according to claim 2 wherein said pressure exerting means comprises a rotatable cylinder aligned with and positioned substantially above said drive means, said rotatable cylinder having a spring means associated therewith adapted for exerting downward pressure on said rotatable cylinder against said second layer.

4. The apparatus according to claim 2 including a solvent dispensing means adapted for applying an organic solvent to said first surface of said second layer prior to positioning said first surface on said first side of said corrugated first layer.

5. The apparatus according to claim 2 including a heater means for heating said first and second layers to a preestablished temperature prior to passing said first and second layers between said pressure exerting means and said drive means.

6. The apparatus according to claim 1 including a heater means for heating said first and second layers to a preestablished temperature prior to bonding said first surface of siad second layer to said corrugated first layer.

7. The apparatus according to claim 6 including a solvent dispensing means adapted for applying an organic solvent to said first surface of said flat second layer prior to positioning said first surface on said first side of said corrugated first layer.

8. The apparatus according to claim 1 including an adjustment means for adjusting the amount of pressure exerted by said ribbed belt member against said ribbed rotatable cylinder.

* * * * *